United States Patent [19]
Kaiser et al.

[11] 3,711,545
[45] Jan. 16, 1973

[54] ALPHA-AMINOALKYL-4-HYDROXY-3-SULFAMOYLAMINOBENZYL ALCOHOLS

[75] Inventors: Carl Kaiser, Haddon Heights, N.J.; Stephen T. Ross, Berwyn, Pa.

[73] Assignee: Smith Kline & French Laboratories, Philadelphia, Pa.

[22] Filed: Feb. 23, 1971

[21] Appl. No.: 118,156

[52] U.S. Cl.......260/556 N, 260/247.1, 260/268 BC, 260/268 S, 260/293.58, 260/293.73, 260/326.5 SF, 260/340.5, 424/248, 424/250, 424/267, 424/274, 424/282, 424/321
[51] Int. Cl..............................................C07c 143/72
[58] Field of Search......................260/247.1, 268 BC, 268 S, 293.58, 260/293.73, 326.5 SF, 340.5, 556 N

[56] References Cited

UNITED STATES PATENTS 3,634,507   1/1972   Boissier et al. ...................260/556 N

*Primary Examiner*—Henry R. Jiles
*Assistant Examiner*—G. Thomas Todd
*Attorney*—William H. Edgerton, Richard D. Foggio, Joan S. Keps, Alan D. Lourie and Joseph A. Marlino

[57] ABSTRACT

α-Aminoalkyl-4-hydroxy-3-sulfamoylaminobenzyl alcohols having β-adrenergic stimulant activity, particularly as selective bronchodilators, are prepared generally from 3-amino-4-benzyloxyphenones by, for example, reaction with a sulfamoyl chloride to give 3-sulfamoylaminophenones, bromination of these phenones and treatment of the resulting α-bromo derivatives with an N-benzyl secondary amine, followed by catalytic hydrogenation to remove the benzyl groups and reduce the ketone moiety.

12 Claims, No Drawings

ALPHA-AMINOALKYL-4-HYDROXY-3-SULFAMOYLAMINOBENZYL ALCOHOLS

This invention relates to novel α-aminoalkyl-4-hydroxy-3-sulfamoylaminobenzyl alcohols which have useful pharmacodynamic activity. More specifically the compounds of this invention have utility as β-adrenergic stimulants with relatively greater activity on respiratory smooth muscle than on cardiac muscle. Therefore these compounds have direct bronchodilator action with minimal cardiac stimulation as demonstrated in standard pharmacological test procedures.

Two in vitro test systems used for determining selective β-stimulant activity are: (1) effect on spontaneous tone of guinea pig tracheal chain preparations as a measure of β-stimulant (direct relaxant) effect on airway smooth muscle, and (2) effect on rate of spontaneously beating right atria of the guinea pig as a measure of β-stimulant effect on cardiac muscle. The compounds of this invention have selective bronchodilating properties since they are active in (1) above at a dose lower than is required in (2) above resulting in a positive separation ratio.

The compounds of this invention are represented by the following general structural formula:

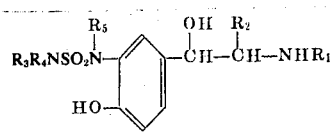

FORMULA I in which:

$R_1$ represents a branched chain lower alkyl group of from three to five carbon atoms, a cycloalkyl or cycloalkylmethyl group, the cycloalkyl moiety having from three to six carbon atoms, or

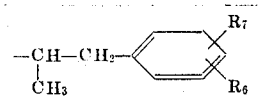

$R_2$ represents hydrogen, methyl or ethyl;

$R_3$ and $R_4$ each represent hydrogen, methyl, ethyl or, taken together with the nitrogen atom to which they are attached, N-pyrrolidinyl, N-piperidinyl, N-morpholinyl or N'-methyl-N-piperazinyl;

$R_5$ represents hydrogen or methyl; and $R_6$ and $R_7$ each represent hydrogen, hydroxy, or methoxy or, taken together, methylenedioxy.

Preferred compounds of this invention are represented by formula I above when $R_1$ is isopropyl, t-butyl, cyclopropyl, cyclopentyl, 4-hydroxyphenylisopropyl or 3,4-dimethoxyphenylisopropyl; and $R_2$ and $R_5$ are hydrogen.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, oxalic, propionic, tartaric, salicylic, citric, glyconic, aspartic, stearic, palmitic, itaconic, glycolic, p-aminobenzoic, glutamic, benzenesulfonic, hydrochloric, hydrobromic, sulfuric, cyclohexyl sulfamic, phosphoric and nitric acids.

Compounds of this invention may be present as d, l optical isomers. Further the compounds of Formula I in which $R_2$ represents methyl or ethyl may be present as diastereoisomers and are designated as erythro and threo isomers which may be resolved into optical isomers. Resolution of optical isomers may be conveniently accomplished by fractional crystallization of their salts with optically active acids such as, for example, tartaric, camphor-10-sulfonic, O,O-dibenzoyltartaric, O,O-di(p-toluoyl)tartaric, menthyloxyacetic, camphoric, or 2-pyrrolidone-5-carboxylic acids or N-acetyltryptophane from appropriate solvents. Unless otherwise specified herein or in the claims, it is intended to include all isomers, whether separated or mixtures thereof.

A preferred compound of this invention is α-(t-butylaminomethyl)-4-hydroxy-3-(N,N-dimethylsulfamoylamino)-benzyl alcohol which relaxes the spontaneous tone of guinea pig tracheal ring preparation at an $ED_{50}$ of 0.035 mcg/ml while increasing the rate of contraction of guinea pig right atria at an $ED_{25}$ of 0.32 mcg/ml. These activities give an absolute separation ratio of 9 which is an 18-fold improvement when compared to the corresponding activity of d, l-isoproterenol (absolute separation ratio = 0.5) in similar in vitro preparations.

The compounds of this invention where $R_3$ and $R_4$ are not hydrogen are prepared as shown in the following sequence of reactions:

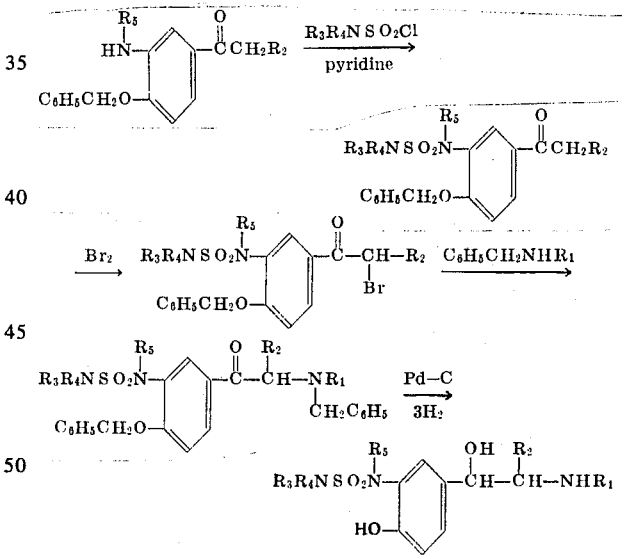

in which $R_1$, $R_2$ and $R_5$ are as defined in formula I. Thus, as shown above, an aminobenzyloxyphenone is treated with an N,N-disubstituted sulfamoyl chloride in a nonreactive solvent such as pyridine or an aromatic hydrocarbon such as benzene or toluene, conveniently at room temperature for from several hours to 24 hours to yield the sulfamoylamino derivative. The latter is treated with bromine or pyrrolidone hydrotribromide and the resultant α-bromophenone is reacted with an N-benzylamine to give the corresponding α-benzylaminophenone. This derivative is hydrogenated catalytically, preferably with palladium-on-carbon, to give the debenzylated sulfamoylaminobenzyl alcohol product.

To prepare the compounds of this invention where $R_3$ and $R_4$ are hydrogen, the above aminobenzyloxyphenone is reacted with sulfamyl chloride, $H_2NSO_2Cl$, preferably in a solvent in which the reactants are substantially soluble, for example in benzene, at about 0°–20 C. to yield the corresponding N,N-unsubstituted sulfamoylaminophenone derivative which is then carried through the same sequence of reactions as described above to obtain the products.

The compounds of formula I in which $R_3$ and $R_4$ are the same or different and represent hydrogen, methyl, ethyl or, when taken together, an N-cyclic amine, are similarly prepared by reacting at about 40°–65° C. an N-acyl-or N-methyl-N-chlorosulfonylaminobenzyloxyphenone (prepared by reacting an N-acyl-or N-methyl-aminobenzyloxyphenone with sodium or sodium hydride followed by sulfuryl chloride) with ammonia, an appropriate lower alkylamine or cyclic amine such as pyrrolidine etc., in an anhydrous solvent such as ether, benzene or toluene. The sulfamoylaminobenzophenone derivative is then reacted as described above to give the corresponding products.

It will be appreciated that the benzylated derivatives of the following formula:

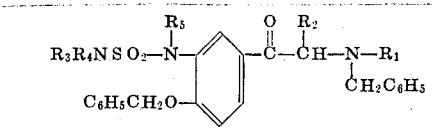

in which $R_1$, $R_2$, $R_3$, $R_4$ and $R_5$ are as defined in formula I, are useful intermediates in the preparation of the products of this invention and as such form a part of the invention.

The aminobenzyloxyphenones used as starting materials herein are known or are prepared by methods known in the art. For example, a 4-hydroxyphenone is nitrated with nitric acid at −20° to −30° C. to yield the 4-hydroxy-3-nitrophenone which is reacted with benzyl chloride in the presence of potassium hydroxide or potassium carbonate to give the 4-benzyloxy-3-nitrophenone and the latter is reduced to the 3-amino-4-benzyloxyphenone using Raney nickel and hydrazine hydrate, platinum oxide and hydrogen or sodium sulfhydrate ($NaSH \cdot 2H_2O$) in dimethylformamide. The amino group is N-methylated by standard procedures.

The compounds of this invention may be administered orally or parenterally in conventional dosage unit forms such as tablets, capsules, injectables or the like, by incorporating the appropriate dose of a compound of formula I, with carriers according to accepted pharmaceutical practices. Preferably a compound or an acid addition salt thereof is administered orally to an animal organism in a tablet or capsule comprising an amount sufficient to produce β-adrenergic stimulant activity. Each dosage unit will contain the active medicament in an amount of about 20 mg. to about 300 mg., preferably about 25 mg. to about 200 mg. Advantageously equal doses will be administered 2 to 4 times daily with the daily dosage regimen being about 40 mg. to about 1,200 mg., preferably about 50 mg. to about 800 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an agueous or nonaqueous liquid suspension.

Of particular applicability is an aerosol dispensing system wherein the active medicament is incorporated with Freon (fluorohydrocarbon) or other inert propellant in an aerosol container. Such an aerosol system will deliver a metered dose of about 600 mcg. to about 4 mg., administered once or twice at a time as needed.

The foregoing is a general description of how to prepare the compounds of this invention. The following examples illustrate the preparation of specific compounds having β-adrenergic stimulant activity. However this should not be construed as a limitation of the invention since appropriate variations in the starting materials will produce other products set forth hereinabove.

EXAMPLE 1

A solution of 23.6 g. (0.098 m.) of 3amino-4-benzyloxyacetophenone in 200 ml. of dry pyridine is treated with 28.6 g. (0.2 m.) of dimethylsulfamoyl chloride in 40 ml. of pyridine at 0°–10° C. The reaction mixture is stirred in the cold overnight, then poured into water and extracted with ether. The ether extract is washed with water and extracted with dilute aqueous potassium hydroxide. The latter extract is washed with ether, acidified with hydrochloric acid and extracted with methylene chloride. The dried methylene chloride solution is evaporated in vacuo to give 4-benzyloxy-3-(N,N-dimethylsulfamoylamino)-acetophenone, m.p. 108°–109.5° C.

To a stirred solution of 1.74 g. (0.005 m.) of 4-benzyloxy-3-(N,N-dimethylsulfamoylamino)-acetophenone in 25 ml. of chlorofrom is added a solution of 0.9 g. (0.0056 m.) of bromine in 25 ml. of chloroform. The mixture is stirred at room temperature for about 30 minutes and the solution is concentrated to leave 4-benzyloxy-α-bromo-3-(N,N-dimethylsulfamoylamino)-acetophenone, m.p. 80°–85° C.

A solution of the α-bromo derivative (19.7 g., 0.05 m.) and 16.3 g. (0.1 m.) of N-benzyl-N-t-butylamine in 300 ml. of acetonitrile is refluxed for 2 hours. The reaction mixture is diluted with ether, cooled and filtered to remove N-benzyl-N-t-butylamine hydrobromide. The filtrate is diluted with ether, acidified with ethereal hydrogen chloride and the precipitate is filtered. The latter is triturated with acetone and filtered to remove N-benzyl-N-t-butylamine hydrochloride. The acetone filtrate is evaporated to give 4-benzyloxy-α-(N-benzyl-N-tnbutylamino)-3-(N,N-dimethylsulfamoylamino)-acetophenone hydrochloride.

The hydrochloride thus prepared (11 g., 0.02 m.) is hydrogenated in 30 ml. of water and 70 ml. of ethanol with 0.5 g. palladium-on-carbon at room temperature for 2 hours in the Parr apparatus. The reaction mixture is filtered, an additional 1 g. of palladium-on-carbon is added and the hydrogenation is continued under the same conditions for 2 hours. The mixture is filtered and stripped with toluene to yield α-(t-butylaminomethyl)-3-(N,N-dimethylsulfamoylamino)-4-hydroxybenzyl alcohol hydrochloride, m.p. 190°–191° C.

EXAMPLE 2

To a solution of 2.7 g. (0.01 m.) of 3-amino-4-benzyloxybutyrophenone in 20 ml. of pyridine at 0°–10° C. is added a solution of 2.9 g. (0.02 m.) of dimethylsulfamoyl chloride in 5 ml. of pyridine. The solution is stirred at room temperature overnight, poured into ice-water and extracted with ether. The ether extract is extracted with 1N potassium hydroxide solution. The latter solution is acidified with dilute hydrochloric acid, just above neutral, and extracted with ether. The dried ether extract is evaporated in vacuo to give 4-benzloxy-3-(N,N-dimethylsulfamoylamino)-butyrophenone, m.p. 247°–250° C. (dec.).

A solution of the above prepared butyrophenone (17.6 g., 0.0467 m.) and 3.98 g. (0.0467 m.) of pyrrolidone in 450 ml. of dry tetrahydrofuran is treated with a solution of 23.4 g. (0.0467 m.) of pyrrolidone hydrotribromide in 450 ml. of dry tetrahydrofuran. The reaction is followed by thin layer chromatography on silica and when the starting material is completely reacted the mixture is filtered to remove pyrrolidone hydrobromide. The filtrate is evaporated in vacuo to give an oil, 4-benzyloxy-α-bromo-3-(N,N-dimethylsulfamoylamino)-butyrophenone.

To a solution of 2.0 g. (0.0044 m.) of the α-bromo derivative in 50 ml. of acetonitrile is added two equivalents of N-benzyl-N-t-butylamine in 50 ml. of acetonitrile and the mixture is refluxed for 2 hours. Working up as described in Example 1 gives 4-benzyloxy-α-(N-benzyl-N-t-butylamino)-3-(N,N-dimethylsulfamoylamino)-butyrophenone hydrochloride which is similarly hydrogenated in methanol/water with palladium-on-carbon to yield α-(1-butylaminopropyl)-3-(N,N-dimethylsulfamoylamino)-4-hydroxybenzyl alcohol hydrochloride, m.p. 212°–214° C.

Similarly, by employing 3-amino-4-benzyloxypropiophenone in the initial reaction with dimethylsulfamoyl chloride and following through the above sequence of reactions there is obtained the corresponding product, α-(1-t-butylaminoethyl)-3-(N,N-dimethylsulfamoylamino)-4-hydroxybenzyl alcohol hydrochloride.

EXAMPLE 3

To a stirred solution of 5.8 g. of sulfamyl chloride in 75 ml. of dry benzene at 10° C. is added, in small portions, 24.1 g. of 3-amino-4-benzyloxyacetophenone. After the mixture is stirred at 10°–20° C. for 30 minutes, it is extracted with 5 percent aqueous sodium hydroxide. Adding dilute hydrochloric acid to the basic extract precipitates the product, 4-benzyloxy-3-sulfamoylaminoacetophenone.

Proceeding in the same sequence of reactions as described in Example 1, namely bromination, reaction with N-benzyl-N-t-butylamine and hydrogenation, yields the corresponding α-(t-butylaminomethyl)-4-hydroxy-3-sulfamoylaminobenzyl alcohol.

EXAMPLE 4

A mixture of 21.4 g. of 3-amino-4-benzyloxyacetophenone and 50 ml. of acetic anhydride is heated on a steam bath for 1 hour. The solution is concentrated in vacuo and the residue is diluted with 5 percent aqueous sodium hydroxide. The mixture is extracted with methylene chloride, then the extracts are dried over anhydrous magnesium sulfate and concentrated. Recrystallization of the residue from ethyl acetate and hexane gives 3-(N-acetamido)-4-benzyloxyacetophenone as colorless crystals, m.p. 132°–134° C.

An anhydrous benzene solution of 3-(N-acetamido)-4-benzyloxyacetophenone is heated at reflux with sodium until a suspension is formed. To this suspension is added sulfuryl chloride in benzene and the resulting mixture is filtered to remove sodium chloride. The filtrate is evaporated to give 3-(N-chlorosulfonylacetamido)-4-benzyloxyacetophenone.

A mixture of 19.0 g. of 3-(N-chlorosulfonylacetamido)-4-benzyloxyacetophenone and 3.1 g. of methylamine in 100 ml. of anhydrous benzene is heated at 50° C. for 4 hours, cooled and filtered. The filtrate is treated with dilute hydrochloric acid and the organic layer is extracted with dilute sodium hydroxide solution. The alkaline solution is acidified to give 4-benzyloxy-3-(N-methylsulfamoylamino)-acetophenone.

To a suspension of 1.7 g. (0.005 m.) of the above prepared acetophenone in 20 ml. of chloroform and 0.2 g. of benzoyl peroxide is added 0.84 g. (5 percent excess) of bromine in 2 ml. of chloroform. The reaction mixture is stirred at room temperature for 45 minutes and then concentrated in vacuo to give 4-benzyloxy-α-bromo-3-(N-methylsulfamoylamino)-acetophenone.

A mixture of 2.0 g. (0.005 m.) of 4-benzyloxy-α-bromo-3-(N-methylsulfamoylamino)-acetophenone, 1.5 g. (0.01 m.) of N-benzylisopropylamine and 20 ml. of acetonitrile is stirred at 40°–50° C. for 1 hour, then it is cooled and diluted with 20 ml. of ether. The reaction mixture is filtered (N-benzylisopropylamine hydrobromide) and the filtrate acidified. The solid is filtered, dissolved in 80 ml. of ethanol and 20 ml. of water, 1 g. of palladium-carbon is added and the mixture is hydrogenated on a Parr shaker (initial hydrogen pressure 60 psi and room temperature). The mixture is filtered after hydrogen uptake is completed and the filtrate is concentrated in vacuo to yield 4-hydroxy-α-(isopropylaminomethyl)-3-(N-methylsulfamoylamino)-benzyl alcohol hydrochloride.

EXAMPLE 5

Following the procedures outlined in Example 1, 4-benzyloxy-α-bromo-3-(N,N-dimethylsulfamoylamino)-acetophenone is reacted with N-benzylcyclopentylamine to give 4-benzyloxy-α-(N-benzylcyclopentylamino)-3-(N,N-dimethylsulfamoylamino)-acetophenone hydrochloride. Similar hydrogenation over palladium-on-carbon gives α-(cyclopentylaminomethyl)-4-hydroxy-3-(N,N-dimethylsulfamoylamino)-benzyl alcohol.

Reacting 4-benzyloxy-α-bromo-3-(N,N-dimethylsulfamoylamino)-acetophenone with N-benzyl-3,4-dimethoxyphenylisopropylamine followed by hydrogenation furnishes the product α-[2-(3,4-dimethoxyphenyl)-1-methylethylaminomethyl]-4-hydroxy-3-(N,N-dimethylsulfamoylamino)-benzyl alcohol.

Similarly, employing N-benzylcylcopropylmethylamine in the above reaction followed by hydrogenation there is obtained α-(cyclopropylmethylaminomethyl)-4-hydroxy-3-(N,N-dimethylsulfamoylamino)-benzyl alcohol.

EXAMPLE 6

Following the procedures of Example 4, 4-benzyloxy-α-bromo-3-(N-methylsulfamoylamino)-acetophenone is reacted with N-benzylphenylisopropylamine to give 4-benzyloxy-α-(N-benzylphenylisopropylamino)-3-(N-methylsulfamoylamino)-acetophenone which is hydrogenated to yield 4-hydroxy-3-(N-methylsulfamoylamino)-α-(2-phenyl-1-methylaminomethyl)-benzyl alcohol.

Similarly, reaction of the 4-benzyloxy-α-bromoacetophenone with N-benzyl-3,4-dibenzyloxyphenylisopropylamine yields as the final product α-[2-(3,4-dihydroxyphenyl)-1-methylethylaminomethyl]-4-hydroxy-3-(N-methylsulfamoylamino)-benzyl alcohol.

Reacting 4-benzyloxy-α-bromo-3-sulfamoylaminoacetophenone with N-benzyl-4-benzyloxyphenylisopropylamine followed by hydrogenation gives α-[2-(4-hydroxyphenyl)-1-methylethylaminomethyl]-4-hydroxy-3-sulfamoylaminobenzyl alcohol and reacting 4-benzyloxy-α-bromo-3-sulfamoylaminoacetophenone with N-benzyl-3,4-methylenedioxyphenylisopropylamine followed by hydrogenation gives α-[2-(3,4-methylenedioxyphenyl)-1-methylethylaminomethyl]-4-hydroxy-3-sulfamoylaminobenzyl alcohol.

EXAMPLE 7

A mixture of 20 g. (0.083 m.) of 3-amino-4-benzyloxyacetophenone and 230 ml. of ethyl formate is stirred and refluxed for 24 hours. The resulting solution is evaporated in vacuo and the residue is dissolved in methylene chloride and washed with dilute acid. The dried organic solution is evaporated in vacuo to give the N-formyl derivative, m.p. 121°–123° C.

To a stirred solution of 13.5 g. (0.05 m.) of 4-benzyloxy-3-formamidoacetophenone in 60 ml. of dimethylsulfoxide under nitrogen is added 2.1 g. (0.05 m.) of a 57 percent dispersion of sodium hydride in mineral oil. The mixture is stirred for about 15 minutes, then cooled in an ice-bath and 8.0 g. (0.055 m.) of methyl iodide in 20 ml. of dimethylsulfoxide is added dropwise. The resulting mixture is stirred at room temperature for about 10 minutes, then heated to 55°–60° C. for 30 minutes. The clear solution is poured into a large volume of ice-water, extracted with ethyl acetate and the dried extract is concentrated to yield 4-benzyloxy-3-(N-methylformamido)-acetophenone, m.p. 75°–78° C.

To a solution of 10.0 g. (0.18 m.) of potassium hydroxide in 15 ml. of water is added a solution of 12.5 g. (0.044 m.) of 4-benzyloxy-3-(N-methylformamido)-acetophenone in 100 ml. of ethanol. The resulting mixture is refluxed for 90 minutes, concentrated in vacuo and the residue is diluted with water. This mixture is extracted with ether and the dried extract is concentrated to give 4-benzyloxy-3-methylaminoacetophenone, m.p. 66°–67 C. The same material is obtained by a 30 minute reflux in 5 percent hydrochloric acid in 50 percent aqueous ethanol.

A suspension of 20.4 g. (0.08 m.) of 4-benzyloxy-3-methylaminoacetophenone in 100 ml. of anhydrous benzene is added slowly to a solution of 4.6 g. (0.04 m.) of sulfamyl chloride in 100 ml. of benzene at 10° C. The reaction mixture is stirred at 10°–20° C. for 30 minutes and then it is extracted with dilute hydrochloric acid. The benzene solution is evaporated to give 4-benzyloxy-3-(N-sulfamoyl-N-methylamino)-acetophenone.

A solution of 3.34 g. (0.01 m.) of 4-benzyloxy-3-(N-sulfamoyl-N-methylamino)-acetophenone in 25 ml. of chloroform is stirred and 1.6 g. (0.01 m.) of bromine in 5 ml. of chloroform is added all at once. Nitrogen is passed through the solution to remove hydrogen bromide and the solution is washed with water/sodium bicarbonate. The dried solution is concentrated to a residue of α-bromo-4-benzyloxy-3-(N-sulfamoyl-N-methylamino)-acetophenone.

To a suspension of 2.8 g. (0.0067 m.) of the above bromo acetophenone in 20 ml. of acetonitrile is added 2.2 g. (0.0134 m.) of N-benzyl-N-t-butylamine. The solution is stirred and refluxed for 1½ hours, cooled, ether is added and the mixture is filtered. The filtrate is diluted with water and the separated ether layer is washed with water, dried and concentrated to give the free base 4-benzyloxy-α-(N-benzyl-N-t-butylamino)-3-(N-sulfamoyl-N-methylamino)-acetophenone.

A solution of the above acetophenone in ethanol is acidified with ethereal hydrogen chloride and the filtered solid is dissolved in ethanol. A mixture of this solution and 10 percent palladium-on-carbon is hydrogenated on the Parr apparatus at room temperature using an initial pressure of 60 psi hydrogen. The mixture is filtered and the filtrate is concentrated in vacuo to give, α-(t-butylaminomethyl)-4-hydroxy-3-(N-sulfamoyl-N-methylamino)-benzyl alcohol hydrochloride.

EXAMPLE 8

A mixture of 19.0 g. of 3-(N-chlorosulfonylacetamido)-4-benzyloxyacetophenone (prepared as described in Example 4) and 7.1 g. of pyrrolidine in 100 ml. of anhydrous benzene is heated at 50° C. for 4 hours, cooled and filtered. The filtrate is treated with dilute hydrochloric acid and the organic layer is extracted with dilute sodium hydroxide solution. The alkaline solution is acidified to yield 4-benzyloxy-3-[N-(1-pyrrolidinylsulfonyl)-amino]-acetophenone.

Carrying out the sequence of reactions as described in Example 1, namely bromination, reaction with N-benzyl-N-t-butylamine and hydrogenation, gives the analogous product, α-(t-butylaminomethyl)-4-hydroxy-3-[N-(1-pyrrolidinylsulfonyl)-amino]-benzyl alcohol.

Similarly reacting piperidine, piperazine and N-methylpiperazine with 3-(N-chlorosulfonylacetamido)-

4-benzyloxyacetophenone yield as the final products, α-(tlbutylaminomethyl)-4-hydroxy-3-[N-(1-piperidinylsulfonyl)-amino]-benzyl alcohol, α-(t-butylaminomethyl)-4-hydroxy-3-[N-(1-piperazinylsulfonyl)-amino]-benzyl alcohol and α-(t-butylaminomethyl)-4-hydroxy-3-[N-(4-methyl-1-piperazinylsulfonyl)-amino]-benzyl alcohol.

EXAMPLE 9

| Ingredients | Mg./Tablet |
|---|---|
| α-(t-butylaminomethyl)-3-(N,N-dimethylsulfamoylamino)-4-hydroxybenzyl alcohol | 50 |
| Calcium sulfate, dihydrate | 125 |
| Sucrose | 25 |
| Starch | 15 |
| Talc | 5 |
| stearic acid | 3 |

The sucrose, calcium sulfate and active medicament (as the hydrochloride) are thoroughly mixed and granulated with hot 10 percent gelatin solution. The wetted mass is passed through a No. 6 mesh screen directly onto drying trays. The granules are dried at 120° F. and passed through a No. 20 mesh screen, mixed with the starch, talc and stearic acid, and compressed into tablets.

What is claimed is:

1. A chemical compound of the formula:

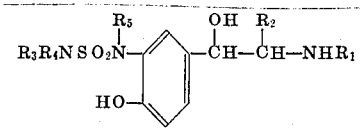

or a pharmaceutically acceptable acid addition salt of said compound, wherein:

$R_1$ is branched chain lower alkyl of from three to five carbon atoms, cycloalkyl or cycloalkylmethyl, the cycloalkyl moiety having from three to six carbon atoms, or

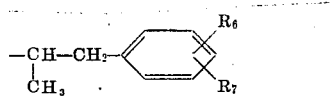

$R_2$ is hydrogen, methyl or ethyl;

$R_3$ and $R_4$ are each hydrogen, methyl, ethyl or, taken together with the nitrogen atom to which they are attached, N-pyrrolidinyl, N-piperidinyl, N-morpholinyl or N'-methyl-N-piperizinyl;

$R_5$ is hydrogen or methyl; and $R_6$ and $R_7$ are each hydrogen, hydroxy, methoxy or, taken together, methylenedioxy.

2. A chemical compound according to claim 1 in which $R_5$ is hydrogen.

3. A chemical compound according to claim 2 in which $R_3$ and $R_4$ are methyl.

4. A chemical compound according to claim 3 in which $R_2$ is hydrogen.

5. A chemical compound according to claim 4 in which $R_1$ is t-butyl, being the compound α-(t-butylaminomethyl)-4-hydroxy-3-(N,N-dimethylsulfamoylamino)-benzyl alcohol.

6. A chemical compound according to claim 4 in which $R_1$ is cyclopentyl, being the compound α-(cyclopentylaminomethyl)-4-hydroxy-3-(N,N-dimethylsulfamoylamino)-benzyl alcohol.

7. A chemical compound according to claim 1 in which $R_3$ is hydrogen, $R_4$ is methyl and $R_2$ and $R_5$ are hydrogen.

8. A chemical compound according to claim 7 in which $R_1$ is isopropyl, being the compound 4-hydroxy-α-(isopropylaminomethyl)-3-(N-methylsulfamoylamino)-benzyl alcohol.

9. A chemical compound according to claim 3 in which $R_2$ is methyl or ethyl.

10. A chemical compound according to claim 9 in which $R_2$ is ethyl and $R_1$ is t-butyl, being the compound α-(1-t-butylaminopropyl)-3-(N,N-dimethylsulfamoylamino)-4-hydroxybenzyl alcohol.

11. A chemical compound according to claim 9 in which $R_2$ is methyl and $R_1$ is t-butyl, being the compound α-(1-t-butylaminoethyl)-3-(N,N-dimethylsulfamoylamino)-4-hydroxybenzyl alcohol.

12. A chemical compound of the formula:

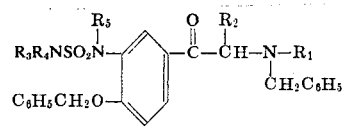

wherein:

$R_1$ is branched chain lower alkyl of from three to five carbon atoms, cycloalkyl or cycloalkylmethyl, the cycloalkyl moiety having from three to six carbon atoms, or

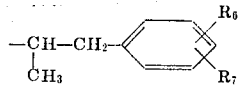

$R_2$ is hydrogen, methyl or ethyl;

$R_3$ and $R_4$ are each hydrogen, methyl, ethyl or, taken together with the nitrogen atom to which they are attached, N-pyrrolidinyl, N-piperidinyl, N-morpholinyl or N'-methyl-N-piperazinyl;

$R_5$ is hydrogen or methyl; and $R_6$ and $R_7$ are each hydrogen, hydroxy, methoxy or, taken together, methylenedioxy.

* * * * *